United States Patent [19]

Jefferson et al.

[11] 4,337,747
[45] Jul. 6, 1982

[54] FUEL INJECTION PUMPING APPARATUS

[75] Inventors: John R. Jefferson, Rainham; Frank Cunliffe, Doddington, both of England

[73] Assignee: Lucas Industries Limited, Birmingham, England

[21] Appl. No.: 224,695

[22] Filed: Jan. 13, 1981

[30] Foreign Application Priority Data

Feb. 8, 1980 [GB] United Kingdom ............... 8004234

[51] Int. Cl.³ ............................................ F02M 59/20
[52] U.S. Cl. ............................. 123/501; 29/156.4 R; 29/467
[58] Field of Search ............. 123/501, 509; 73/119 A; 29/156.4 R, 467

[56] References Cited

U.S. PATENT DOCUMENTS

| 3,601,109 | 8/1971 | Barton et al. | 123/501 |
| 4,142,498 | 3/1979 | Hammond | 123/501 |
| 4,198,948 | 4/1980 | Conrad et al. | 123/495 |
| 4,294,218 | 10/1981 | King et al. | 123/501 |
| 4,305,352 | 12/1981 | Oshima et al. | 123/501 |

FOREIGN PATENT DOCUMENTS

| 2843039 | 4/1980 | Fed. Rep. of Germany | 123/501 |
| 777073 | 2/1935 | France | 123/501 |
| 1214944 | 12/1970 | United Kingdom | 123/501 |

Primary Examiner—Charles J. Myhre
Assistant Examiner—Magdalen Moy

[57] ABSTRACT

A fuel injection pumping apparatus includes a housing having a boss portion through which extends a drive shaft. An adjustable member is mounted about the boss portion and a two part sprocket is mounted on the shaft. One part of the sprocket has an aperture which can be aligned by a tool, with an aperture in the member. Assuming that the member is correctly adjusted, the tool is inserted into the apertures and the driving belt or chain engaged with the part of the sprocket. When the engine and driving belt are in the correct position the sprocket parts are secured together so that the shaft is correctly positioned relative to the engine.

3 Claims, 1 Drawing Figure

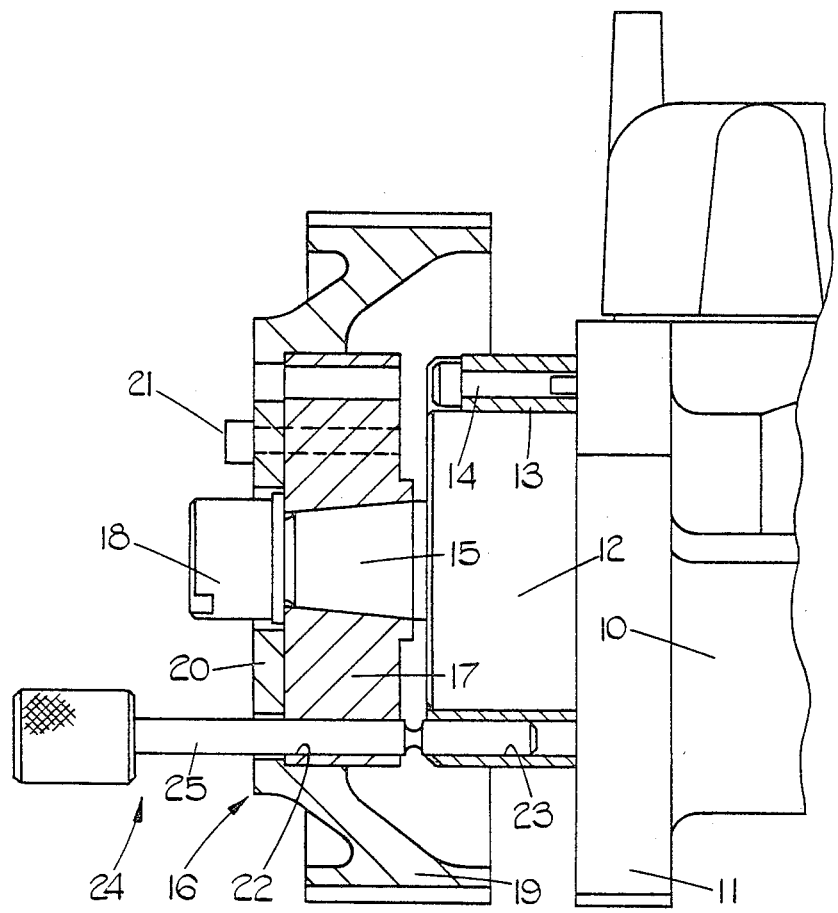

FUEL INJECTION PUMPING APPARATUS

This invention relates to fuel injection pumping apparatus of the kind comprising a housing, a drive shaft extending from the housing, sprocket means mounted on the drive shaft, said sprocket means defining a toothed peripheral surface for engagement in use, with a flexible drive member which is also engaged with a sprocket driven by the associated engine, the apparatus including an injection pump driven by said drive shaft and which delivers fuel at a predetermined time, to an outlet.

In order to ensure that the engine receives fuel at the correct time, it is necessary to time the pump and engine. It is known to provide an adjustable mounting for the housing of the apparatus so that once the drive member has been engaged with the sprockets and the engine set in a known position, the housing of the apparatus can be moved about the axis of rotation of the drive shaft to achieve the correct relationship between the drive shaft and housing appropriate for the set engine position. This method of adjustment generally requires a cover to be removed from the housing of the apparatus to be able to inspect timing marks and there is therefore the possibility of dirt entering the housing. Moreover, it is usual to employ a tensioning device where the drive member is in the form of a toothed belt or a chain. The forces exerted by the tensioning device are considerable and these forces make it difficult to achieve an accurate setting.

The object of the present invention is to provide an apparatus of the kind specified whereby timing of the engine and apparatus can be more readily achieved.

According to the invention in an apparatus of the kind specified the sprocket means is formed in two parts, one of which is rigidly secured to the drive shaft and the other of which is adjustably secured to said one part and has a peripheral surface for engagement by the drive member, and the housing of the apparatus mounts an adjustable member, said adjustable member and said one part defining apertures which can be engaged in use, by a retaining tool, the arrangement being such that in use the adjustable member is accurately set relative to the housing of the apparatus before the apparatus is secured to the engine, said retaining tool being engaged in said apertures to hold the drive shaft at a predetermined position whilst the engine position is adjusted after which the sprocket parts are secured together.

An example of an apparatus in accordance with the invention will now be described with reference to the accompanying drawing which shows a part sectional side elevation of a portion of the apparatus.

With reference to the drawing the apparatus comprises a housing 10 having an integral mounting flange 11 which includes apertures for the reception of bolts whereby the housing can be secured to an engine structure. The housing also includes a generally cylindrical boss portion 12 which is surrounded by an annular member 13. The member 13 can be secured to the housing by means of retaining bolts 14, the member being provided with extended slots whereby its position on the boss portion can be adjusted.

Extending from the housing is a tapered drive shaft 15 which within the apparatus is connected to a rotary distributor member which mounts a pair of pumping plungers adapted to be moved inwardly at predetermined positions of the drive shaft, by means of cam lobes. Inward movement of the plungers by the cam lobes effects delivery of fuel to outlet ports in turn, which in use are connected to the injection nozzles of the associated engine.

The drive shaft 15 mounts sprocket means generally indicated at 16 and which comprises a first part 17 which can be secured on the drive shaft by means of a retaining nut 18. The sprocket means includes a second part which is referenced 19 and which has a toothed peripheral surface for engagement by a drive member for example in the form of a flexible toothed belt. The part 19 has a flange portion 20 provided with elongated apertures for the reception of bolts 21 whereby the two parts of the sprocket means can be secured together.

The first part of the sprocket means is provided with an axially extending aperture 22 and the part 13 is provided with a similar aperture 23. These apertures in use can receive a retaining tool generally indicated at 24, but essentially comprising a cylindrical stem 25 which is a push fit within the apertures 22, 23. The second part of the sprocket means is provided with an enlarged aperture so that the stem 25 can be inserted in the apertures 22 and 23 but at the same time the second part of the sprocket means can be moved relative to the first. Further apertures are provided in the sprocket parts for the purpose of attaining access to the bolts 14.

In use, when the apparatus is being tested following production the sprocket parts are secured together and the stem of the retaining tool engaged with the apertures 22, 23. The bolts 14 are loose. The drive shaft 15 is then positioned relative to the housing 10 and this corresponds to the aforesaid predetermined position. Once this position has been accurately established, the bolts 14 are tightened and then the retaining member can be withdrawn from the apertures. As an alternative the apparatus can be mounted in a test rig and using a stroboscopic light the predetermined position of the shaft determined whilst the shaft is rotated. Once the predetermined position has been located the member 14 can be correctly positioned on the housing by aligning the apertures 22 and 23. The bolts 14 are then tightened to lock the member 13 to the housing.

When it is required to assemble the apparatus to an engine, it may be necessary to remove the sprocket part 19 but in any event, it is necessary to slacken the bolts 21. The flange 11 can be secured to the engine structure and the driving belt engaged about the part 19 of the sprocket means. The driving belt can also be tensioned. Either before or after the tensioning stage, the retaining tool is engaged with the apertures 22, 23 to place the shaft in the aforesaid predetermined position. The engine is then adjusted so that it also is in a predetermined position and during such adjustment relative movement may take place between the sprocket parts. Once the engine has been set in its correct position, the bolts 21 can be tightened and the retaining tool removed.

In the manner described timing of the engine and apparatus is greatly facilitated particularly where, as described, a driving belt is employed with a tensioning device. It will be appreciated that the same arrangement may be used where the apparatus is driven by a chain.

We claim:

1. A fuel injection pumping apparatus of the kind comprising a housing, a drive shaft extending from the housing, sprocket means mounted on the drive shaft, said sprocket means defining a toothed peripheral surface for engagement in use, with a flexible drive member which is also engaged with a sprocket driven by the associated engine, the apparatus including an injection pump driven by said drive shaft and which delivers fuel at a predetermined time, to an outlet, said sprocket means being formed in two parts, one of which is rigidly secured to the drive shaft and the other of which is adjustably secured to said one part and has a peripheral surface for engagement by the drive member, and the housing of the apparatus mounts an adjustable member, said adjustable member and said one part defining apertures which can be engaged in use, by a retaining tool, the arrangement being such that in use the adjustable member is accurately set relative to the housing of the apparatus before the apparatus is secured to the engine, said retaining tool being engaged in said apertures to hold the drive shaft at a predetermined position whilst the engine position is adjusted after which the sprocket parts are secured together.

2. An apparatus according to claim 1 in which said adjustable member is of annular form and is adjustably mounted about a boss portion of the apparatus.

3. An apparatus according to claim 2 in which said apertures extend parallel to the axis of rotation of the shaft.

* * * * *